Aug. 25, 1953          R. B. HOLT          2,649,614
MEANS TO CLOSE FILLING OPENING IN PREPARED POULTRY
Filed Oct. 20, 1950
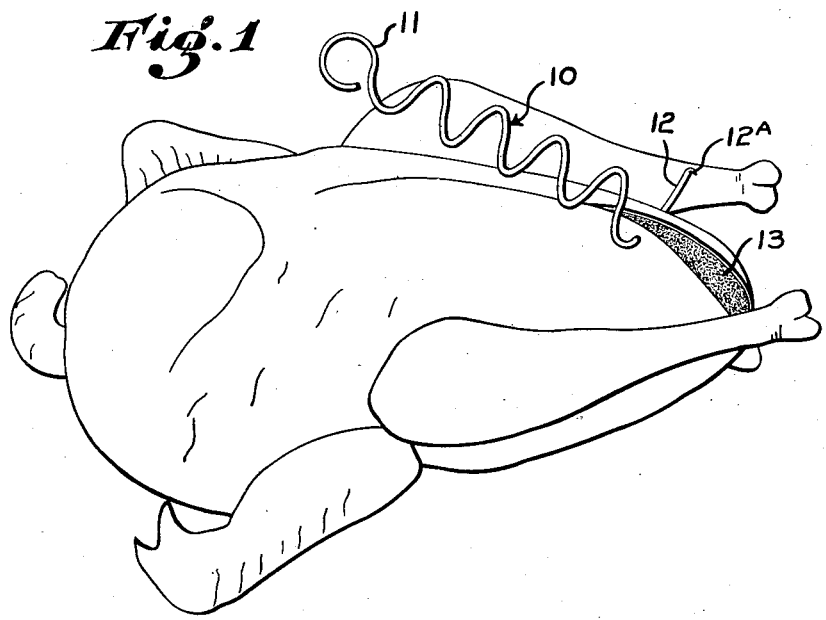
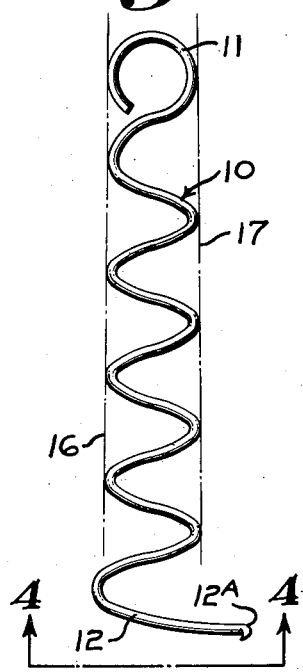
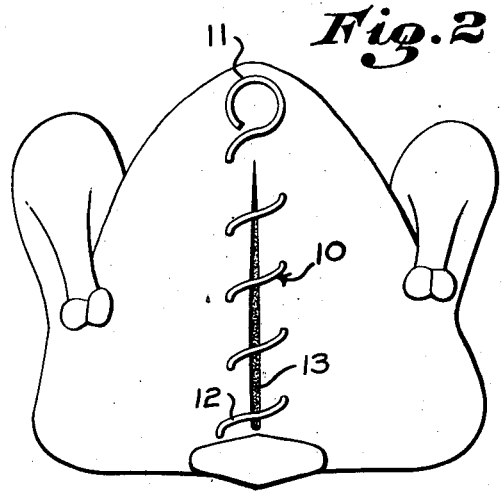
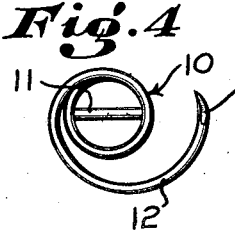
INVENTOR.
RAYMOND B. HOLT
BY *Lyon & Lyon*
ATTORNEYS Patented Aug. 25, 1953

2,649,614

UNITED STATES PATENT OFFICE 2,649,614

MEANS TO CLOSE FILLING OPENING IN PREPARED POULTRY

Raymond B. Holt, Alhambra, Calif.

Application November 20, 1950, Serial No. 196,622

4 Claims. (Cl. 17—11)

The present invention relates to an improved poultry skewer.

The present invention contemplates the provision of a skewer fabricated entirely from wire which is shaped generally in the form of an open convolution screw, with the forward end thereof, however, of larger convolution than the succeeding portion of the screw whereby opposite edges defining the filling opening in fowl are automatically drawn together when and as the skewer is applied.

An object of the present invention is therefore to provide an improved poultry skewer of this character having the aforementioned feature.

Another object of the present invention is to provide an improved poultry skewer characterized by the fact that the forward end of the skewer is defined by a larger convolution than the body portion for facilitating the application of the skewer and also for tightly closing the filling opening in the fowl.

The features of the present invention which are believed to be novel are set forth with particularity in the appended claims. This invention itself, both as to its organization and manner of operation, together with further objects and advantages thereof, may be best understood by reference to the following description taken in connection with the accompanying drawings in which:

Figure 1 is a perspective view showing a fowl associated with a skewer embodying features of the present invention in the initial stage of applying the skewer, Figure 2 is an end view of the fowl shown in Figure 1 with the skewer fully applied to seal the filling opening, Figure 3 is a view in elevation of the skewer shown in Figures 1 and 2, and Figure 4 is a view in elevation showing the forward end of the skewer taken in the direction indicated by the line 4—4 in Figure 3.

The skewer 10 comprises simply a helical screw having one of its ends 11 formed in a loop to provide a handle and adapted to be manually engaged and turned. The other end 12 is defined by a convolution of larger diameter than the body portion of the helical screw to facilitate insertion of the screw end and to cause the edges of the filling aperture 13 in the fowl to be drawn together when and as the skewer is turned by applying torque to the handle portion 11.

The important novel feature of the present invention is deemed to reside in the provision of the enlarged convolution 12 at its forward end. The forward end of the wire 12 is preferably machined, as for example, by grinding to provide a sharp point.

It is readily clear that when and as the helical screw 10 is placed as shown in Figure 1, with the pointed forward end 12A of the skewer piercing one of the edges of the apertured portion 13, and the skewer 10 turned, the first larger convolution of the skewer 10 produces comparatively small relative movement between the edges defining the opening 13. However, as the skewer 10 is progressively turned, the smaller diameter convolutions of the skewer are then effective to draw the edges defining the opening 13 closer together and in a gradual manner, thus requiring relatively small effort.

While the drawings show the handle end 11 formed by bending the wire generally in the form of a rectangle, it is apparent that this end may be bent to form other configurations such as a circle, triangle, or other conveniently grasped portion to which torque may be applied to cause rotation of the skewer about its own axis in the process of applying and removing the skewer.

In forming the helical screw, the forward convolution thereof is so formed that the point 12A is displaced from the longitudinal axis of the screw a distance approximately equal to three times the radius of the intermediate contiguous spiral portion.

Furthermore, while as shown in Figure 3, the outer edges of the intermediate convolutions of the screw lie generally on a pair of lines 16, 17, which converge slightly in the direction of the handle end 11, satisfactory results have been achieved where such lines 16, 17 are parallel, i. e., the intermediate convolutions of the screw have the same diameter.

While the particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

I claim:

1. A skewer of the character described, comprising a wire in the form of a helical screw, one end of the wire being in the form of a loop to provide a handle with the plane of the loop extending substantially parallel with the axis of the helical screw whereby an operator may grasp the said loop to apply torque to cause rotation of the screw about its axis, the other end of the wire continuing into a convolution of greater mean diameter than the contiguous intermediate portion of the helical screw and extending for at least one half a turn from said intermediate portion.

2. A skewer of the character described, comprising a helical screw having the forward convolution thereof of greater mean diameter than the contiguous intermediate portion of the screw and with said forward convolution extending at least one half a turn from said intermediate portion.

3. A skewer comprising a helical screw having a forwardmost convolution of enlarged mean diameter with respect to the contiguous intermediate portion of the screw and with said forwardmost convolution extending at least one half of a turn from said intermediate portion, the forward tip of said forwardmost convolution being displaced from the longitudinal axis of the screw a distance approximately equal to three times the radius of the convolutions of said intermediate portion.

4. A skewer of the character described, comprising a wire forming a helical screw spring with one end of said wire forming a handle with the plane of the handle extending substantially parallel with the axis of the helical screw spring, the other end of said wire being curved generally outwardly from a circle defining the convolutions of the contiguous intermediate portion of the screw and the tip of said other end extending at least one-half of a turn from said intermediate portion and said tip being displaced from the longitudinal axis of the screw a distance approximately equal to three times the radius of the convolutions of the helical screw spring.

RAYMOND B. HOLT.

References Cited in the file of this patent

UNITED STATES PATENTS

| Number | Name | Date |
|---|---|---|
| 1,427,782 | Brogan | Sept. 5, 1922 |
| 2,192,643 | Kennedy | Mar. 5, 1940 |
| 2,210,414 | Kautz | Aug. 6, 1940 |